March 26, 1957 R. W. PRICE 2,786,467
APPARATUS FOR DISPENSING INTRAVENOUS SOLUTIONS
Filed July 1, 1955

INVENTOR.
Russell W. Price
BY
J. Stanley Churchill.
ATTORNEY

# United States Patent Office 2,786,467
Patented Mar. 26, 1957

2,786,467

APPARATUS FOR DISPENSING INTRAVENOUS SOLUTIONS

Russell W. Price, Newton, Mass.

Application July 1, 1955, Serial No. 519,478

10 Claims. (Cl. 128—214)

This invention relates to apparatus for dispensing liquids to be intravenously administered to a patient.

The invention has for an object to provide novel and improved apparatus of the character specified having novel provision disposed within the dispensing container for metering the liquid and visibly indicating the drip or flow thereof in a superior and highly efficient manner.

With this general object in view and such others as may hereinafter appear, the invention consists in the apparatus for dispensing intravenous solutions hereinafter described and particularly defined in the claims at the end of this specification.

In the drawings illustrating the preferred embodiment of the invention:

In general the present invention contemplates novel and improved apparatus for dispensing solutions, such as saline or dextrose solutions, to be intravenously administered to a patient. The illustrated apparatus includes a novel drip metering and flow indicating device disposed within the dispensing container which is connected to or forms a part of the container closure so that in practice when the closure is vacuum sealed to the container under sterile conditions during filling and closing of the container in the manufacture thereof, the metering device may be maintained free of contamination during transportation and use.

One of the novel features of the present apparatus includes a siphoning arrangement in communication with the drip tube of the flow indicating chamber which extends to a point adjacent to the inner surface of the closure whereby in practice substantially all of the liquid in the container may be dispensed through the metering device. A normally closed valve is provided above the drip tube which is arranged to seal off direct communication between the liquid and the drip chamber when the apparatus is in its inverted or operative position and which may be opened by manipulation of the flexible dispensing tube connected to the drip chamber to admit air therethrough and to permit entrance of sufficient liquid through the siphoning tube to form a liquid seal in the chamber when preparing the apparatus for use. When the apparatus is in its upright position, the drip tube valve is normally open to permit the drip chamber to be drained back into the main body of liquid in the container when the level of the liquid is below the end of the unit, this feature being of advantage to correct the level of the sealing liquid in the drip chamber when inadvertently overfilled and also to prevent filling of the drip chamber during transit of the apparatus.

Another feature of the present invention resides in novel provision for admitting air into the container as the liquid is withdrawn during the dispensing operation and includes a relatively short air intake tube mounted in the closure and having a valve associated therewith for preventing escape of liquid therethrough when the container is in its inverted or operative position and which is adapted to be opened to admit air in response to a reduction in atmospheric pressure within the container as the liquid is withdrawn.

In practice the metering unit and the air intake unit may comprise an integral glass or molded plastic member fitted into openings in a conventional dispensing container closure, or in a modified embodiment of the invention the closure and the metering and air intake members may comprise an integral molded pastic unit adapted to be heat sealed to the mouth of a plastic dispensing container. However, the various parts of the device may be made separately and assembled with airtight connections in accordance with conventional manufacturing procedures.

Figure 1:
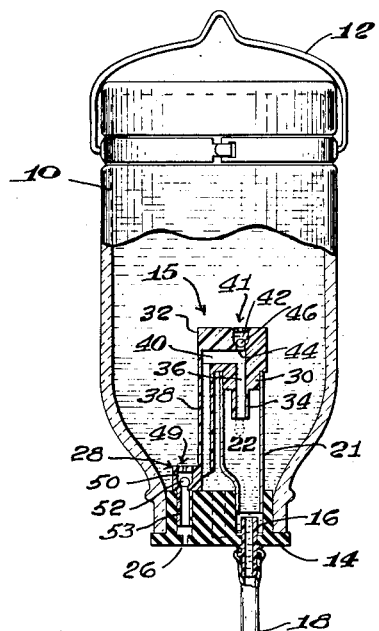
Fig. 1 is a side elevation partly in cross section of intravenous dispensing apparatus embodying the present invention and shown in its inverted or operative position.
Figure 2:
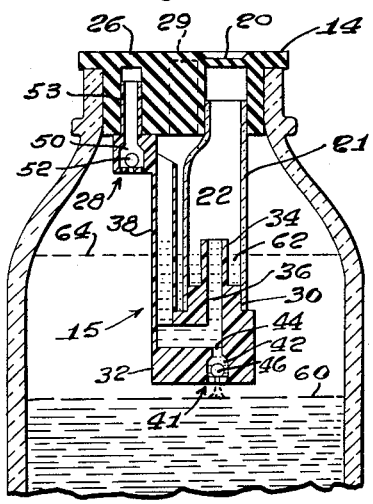
Fig. 2 is an enlarged detail view in cross section of the closure end of the apparatus shown in an upright position.
Figure 4:
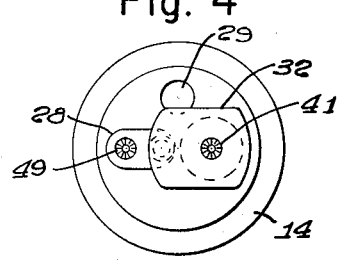
Fig. 4 is a plan view of the metering and flow indicating device as seen from the underside viewing Fig. 2.

Referring now to the drawings, in the embodiment of the invention illustrated in Fig. 1, 10 represents a filled glass container having a bail 12 at one end for suspending the container in an inverted position above the patient to permit a gravity flow of the liquid, and 14 represents a closure for the container, preferably of rubber or other resilient material and in which is supported the drip metering or flow indicating device extended within the container as indicated generally at 15. In practice, as shown in Fig. 2, the closure 14 with its metering device 15 attached thereto may be hermetically sealed to the container as a unit under vacuum during the filling and closing operations in the manufacture thereof whereby to maintain the parts free of contamination during transit and use. When being prepared for use, a nipple 16 having a length of flexible tubing 18, comprising the dispensing tube, connected thereto may be inserted through a relatively thin walled portion 20 of the closure into communication with the open end of the drip chamber indicated at 22 and in airtight relation to the closure. The dispensing tube 18 may be provided with a conventional flow control clamp 24 and a needle 25 for insertion into the vein of the patient to perform the infusion operation. A second thin walled portion 26 in the closure may also be penetrated to form an opening communicating with an air intake portion 28 of the device, as will be described. In practice a third thin walled portion indicated at 29 in the closure may be provided for the purpose of injecting other medicinal solutions into the container if desired in accordance with conventional practice.

In the embodiment of the invention shown in Fig. 1, the metering device 15 includes a cylindrical tubular member 21, preferably of glass or other transparent material, defining the drip chamber 22 having one end reduced in diameter and offset, as shown, to fit into the standard bore provided in a conventional resilient closure member 14 for connection with the nipple 16 and the flexible dispensing tube 18 through the thin walled portion 20.

Figure 5:
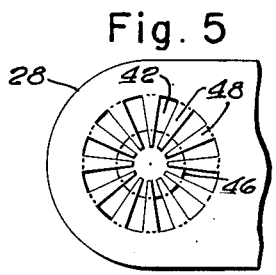
Fig. 5 is an enlarged plan detail view of a portion of the valves shown in Fig. 4.

The upper end of the tubular member 21 is fitted in airtight relation over a depending cylindrical shouldered portion 30 of a cap or head portion 32 of the metering unit which may and preferably will comprise a molded transparent plastic material, and a relatively short and reduced diameter tubular extension depending from the shouldered portion forms the drip nozzle 34. The drip nozzle forms an extension of a vertical passageway 36 in the head portion 32, the head portion being also provided with an integral depending tubular siphoning member 38, and a horizontal passageway 40 in the head portion provides communication between the siphoning tube and the drip nozzle as shown. The head portion 32 is also provided with a valve 41 comprising a chamber 42 having a passageway or port 44 substantially in alignment with the drip nozzle 34, the port forming a seat for a ball 46 arranged to close off direct communication through the head portion between the main body of the liquid in the container and the drip nozzle when the apparatus is in its inverted or operative position as shown in Fig. 1. The outer end of the chamber is open and is preferably slotted to form a plurality of relatively flexible radial arms 48 extended inwardly, as shown in detail in Fig. 5, to permit introduction of the ball 46 by flexing the arms downwardly, the arms returning to their initial position to retain the ball in the chamber after the same is fully inserted therein.

The open end of the siphoning tube 38 extends to a point adjacent the inner face of the closure 14, and the air intake portion 28 may and preferably will be formed integrally with one side of the siphoning tube and includes a valve 49 having a chamber 50 provided with a ball 52, the air intake portion being also provided with a tubular portion 53 communicating with the chamber and extended into a bore formed in the inner face of the closure which may be opened to the atmosphere by penetrating the thin walled portion 26 as shown. In practice a hollow needle may be inserted through the thin walled portion into communication with the tubular portion 53 to maintain communication with the atmosphere. In operation the ball 52 is seated in the lower end of the chamber 50 when the apparatus is inverted, as shown in Fig. 1, to prevent draining of liquid from the container through the opening and to cut off communication with the atmosphere until such time as withdrawal of liquid from the container reduces the atmospheric pressure within the container sufficiently to permit elevation of the ball from its seat to admit air into the container and equalize the pressure therein. The open end of the valve chamber 50 may and preferably will be formed with flexible arms 48 in a manner similar to the open end of the valve chamber 42 previously described.

In the operation of the device, prepared as shown in Fig. 1, the clamp 24 is first tightened to close off any air from the needle end of the flexible tube 18 and by successively squeezing and releasing the dispensing tube above the clamp, air in the tube is forced through the drip chamber and the drip nozzle to elevate the ball 46 in the head valve and permit air to enter the container in the form of air bubbles which tends to increase the head pressure above the level of the liquid and force small increments of liquid to enter the drip chamber through the siphoning tube each time the dispensing tube is squeezed and released. This procedure known in the art as "milking" may be continued until the drip chamber 22 is filled to a predetermined level, preferably a substantial distance, approximately one-half inch, below the end of the drip nozzle 34 to serve as a seal at the bottom of the drip chamber to prevent air from entering the dispensing tube during the infusing operation and to provide a liquid-free chamber through which the flow of liquid from the drip nozzle may be observed during the infusing operation. The control clamp 24 may then be partially opened, and liquid permitted to flow into the flexible dispensing tube 18 to fill the same whereby to expel all air therefrom, whereupon the control clamp 24 may be again closed and the needle inserted into the vein of the patient. It will be observed that after the milking operation and opening of the control clamp 24 the weight of the liquid suspended in the dispensing tube 18 between the drip chamber and the clamp causes a reduction in atmospheric pressure in the drip chamber to start the flow of liquid through the siphoning tube 38, passageway 40 and drip nozzle 34 to effect complete filling of the dispensing tube, the predetermined level of the liquid in the drip chamber being maintained at all times during the withdrawal of liquid from the container because of the relatively small passageway through the needle 25 relative to the larger diameter passageway in the tube 18 and drip chamber 22. After insertion of the needle into the vein of the patient the flow control clamp 24 may be opened and adjusted to permit the desired number of drops per minute to be infused into the patient's veins. It will also be observed that as liquid is withdrawn from the container by gravity the atmospheric pressure is reduced, and when a sufficient differential pressure is built up within the container the ball 52 of the air intake valve 49 will be lifted to admit sufficient air into the container to equalize the pressure. It will also be observed that the head valve 41 is closed during the infusion operation so that all of the fluid enters the drip chamber through the siphoning tube 38, the liquid continuing to be withdrawn by siphoning until the level thereof reaches the open end of the siphoning tube adjacent the inner face of the closure so that substantially all of the liquid may be dispensed from the container.

As illustrated in Fig. 2, when the container is initially filled to a level below the head 32 of the metering device, as indicated at 60, the valve 41 is open so that any liquid which may be introduced into the drip chamber 22 during transit, as may occur when the container is laid on its side, is immediately drained into the main body of liquid through the open end of the valve when the container is placed in an upright position, except for a small amount of liquid retained in the annular space 62 defined by the drip nozzle 34 and the walls of the drip chamber 22. This feature of the invention is of advantage when preparing the apparatus for use to provide a predetermined level of the liquid in the drip chamber, the draining feature preventing overfilling of the drip chamber to an extent such that the air space between the end of the drip nozzle and the predetermined level of the liquid in the drip chamber will be entirely filled so as to prevent observance of the rate of drip from the nozzle 34. The relatively small amount of liquid retained in the annular space 62 will fall into the bottom of the chamber to form an initial liquid seal when the container is inverted, the level then being raised as desired in the drip chamber by the "milking" process described. When the initial level of the liquid in the container is above the head 32 of the metering unit, as indicated at 64 in Fig. 2, any overfilling of the drip chamber 22 may be remedied by "milking" the dispensing tube 18 with the container in an upright position to force the liquid down through the open valve 41 in the head 32 and into the main body of the liquid, whereupon the container may be placed in its inverted position and the level adjusted as required. In practice the glass tube 21 defining the drip chamber 22 may comprise a transparent colored glass designed to permit easy visibility of the drops of liquid passing therethrough.

Figure 3:
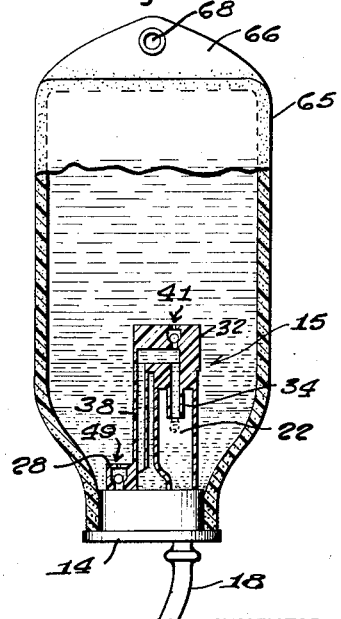
Fig. 3 is a view similar to Fig. 1 showing the metering and flow indicating device embodied in a plastic container.

In the modified form of the invention illustrated in Fig. 3 the container 65 may comprise a plastic bag having a flap 66 provided with an opening 68 to suspend the bag in an inverted position. In this embodiment of the invention the closure 14, drip chamber 22, head portion 32 and air intake portion 28 of the metering unit 15 may comprise an integral molded transparent plastic material wherein the closure may be heat sealed to the mouth of the plastic bag, the operating parts being otherwise of the same construction and mode of operation as the metering unit shown in Figs. 1 and 2.

From the above description of the invention it will be seen that the present apparatus for dispensing intravenous solutions provides a convenient and efficient metering device disposed within the container and connected to or forming an integral part of the container closure so that when the unit is sealed at the point of manufacture the parts of the device will be maintained in a sterile condition during transit and use. It will also be observed that the novel siphoning arrangement embodied in the metering device permits dispensing of substantially all of the liquid from the container during infusion. The unitary structure of the present device replaces a number of separate elements used in prior art dispensers and may be economically manufactured to produce a unitary disposable unit for use in intravenous infusions. While the present apparatus is particularly designed for such use, it will be apparent that the device may be used for other purposes where a controlled drip feed or flow is required.

While the preferred embodiment of the invention has been herein illustrated and described, it will be understood that the invention may be embodied in other forms within the scope of the following claims.

Having thus described the invention, what is claimed is:

1. In apparatus for dispensing liquids to be intravenously administered to a patient, a container for holding the liquid provided with a closure, a drip metering device connected to said closure and extending within the container including a drip chamber, a drip nozzle communicating with said chamber, and a siphoning tube in communication with said drip nozzle, means for permitting withdrawal of liquid from the drip chamber through the closure, and means for admitting air through the closure into the container.

2. In apparatus for dispensing liquids to be intravenously administered to a patient, a container for holding the liquid provided with a closure, a drip metering device connected to said closure and extending within the container including a drip chamber, a drip nozzle communicating with said chamber, and a siphoning tube in communication with said drip nozzle, means for permitting withdrawal of liquid from the drip chamber through the closure, and means for admitting air through the closure into the container, said metering device having a valve through which air may be forced from the chamber to increase the pressure in the container and force liquid through the siphoning tube and drip nozzle into said chamber.

3. Apparatus as defined in claim 2 wherein the valve is normally closed to prevent communication between the main body of liquid and the chamber when in use in an inverted position, and which permits draining of liquid from the chamber into the main body of liquid when the apparatus is in an upright position.

4. In apparatus for dispensing liquids to be intravenously administered to a patient, a container for holding the liquid provided with a closure, a drip metering device connected to said closure and extending within the container including a drip chamber, a drip nozzle communicating with said chamber, and a siphoning tube in communication with said drip nozzle, means for permitting withdrawal of liquid from the drip chamber through the closure, and means for admitting air through the closure into the container, the open end of said siphoning tube extending to a point adjacent the inner face of the closure whereby substantially all of the liquid in the container may be dispensed through said siphoning tube.

5. In apparatus for dispensing liquids to be intravenously administered to a patient, a container for holding the liquid provided with a closure, a drip metering device connected to said closure and extending within the container including a drip chamber, a drip nozzle communicating with said chamber, and a siphoning tube in communication with said drip nozzle, means for permitting withdrawal of liquid from the drip chamber through the closure, and means for admitting air through the closure into the container, said air admitting means including a relatively short tubular member having a passageway in communication with an opening in the closure and the main body of liquid and a valve arranged to close said passageway for preventing escape of liquid through the closure when the apparatus is inverted, and permitting entrance of air upon withdrawal of liquid and reduction of atmospheric pressure within the container.

6. Apparatus as defined in claim 5 wherein the air admitting valve includes a ball valve freely movable in and confined within a valve chamber formed in said tubular member.

7. In apparatus for dispensing liquids to be intravenously administered to a patient, a container for holding liquid provided with a closure, a drip metering device mounted within the container including a tubular member defining a drip chamber attached to the closure and extended within the container, a head portion provided with a drip nozzle secured to and in communication with the extended end of said tubular member, a siphoning tube formed integrally with said head portion and in communication with said drip nozzle, the open end of said siphoning tube extending to a point adjacent the inner surface of said closure, means for permitting withdrawal of liquid from the drip chamber through said closure, and means for admitting air through the closure into the container.

8. In apparatus for dispensing liquids to be intravenously administered to a patient, a container for holding liquid provided with a closure, a drip metering device mounted within the container including a tubular member defining a drip chamber attached to the closure and extended within the container, a head portion provided with a drip nozzle secured to and in communication with the extended end of said tubular member, a siphoning tube formed integrally with said head portion and in communication with said drip nozzle, the open end of said siphoning tube extending to a point adjacent the inner surface of said closure, means for permitting withdrawal of liquid from the drip chamber through said closure, and means for admitting air through the closure into the container, a passageway in said head portion between said drip nozzle and the main body of liquid, and a ball valve cooperating with said passageway and through which air may be forced from the chamber to increase the pressure in the container and force liquid through the siphoning tube and drip nozzle into said chamber to provide a predetermined level of liquid in the chamber when the apparatus is in an inverted position, said valve being open to permit draining of an overfilled chamber into the main body of liquid when the apparatus is in an upright position and the liquid level in the container is below said head portion, said valve also permitting liquid to be forced therethrough from an overfilled chamber into the main body of liquid with the apparatus in an upright position when the liquid level in the container is above said head portion.

9. Apparatus as defined in claim 8 wherein the drip metering device comprises a tubular glass member defining the drip chamber, and wherein the head member, siphoning tube and air intake portions comprise an integral transparent molded plastic unit.

10. Apparatus as defined in claim 8 wherein the container comprises a flexible plastic bag, and wherein the metering device and the closure comprises an integral molded plastic unit with the closure heat sealed to the mouth of the plastic bag.

References Cited in the file of this patent
UNITED STATES PATENTS

| | | |
|---|---|---|
| 2,333,685 | Schwab | Nov. 9, 1943 |
| 2,414,240 | Page | Jan. 14, 1947 |
| 2,648,333 | Cutter | Aug. 11, 1953 |